(12) United States Patent
Boutcher et al.

(10) Patent No.: US 8,817,968 B1
(45) Date of Patent: Aug. 26, 2014

(54) SHORT MESSAGE SERVICE (SMS) RESPONSE AND INTERPRETATION APPLICATION

(71) Applicant: West Corporation, Omaha, NE (US)

(72) Inventors: James K. Boutcher, Omaha, NE (US); Geetha Gopalakrishnan, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 14/036,914

(22) Filed: Sep. 25, 2013

(51) Int. Cl.
*H04M 3/00* (2006.01)
*H04M 5/00* (2006.01)

(52) U.S. Cl.
USPC ............ 379/265.09; 379/265.01; 379/265.02; 379/266.01; 379/309

(58) Field of Classification Search
USPC ............ 379/265.09, 265.01, 265.02, 266.01, 379/309
See application file for complete search history.

(56) References Cited

U.S. PATENT DOCUMENTS

2011/0235797 A1* 9/2011 Huet et al. ............... 379/265.09

* cited by examiner

*Primary Examiner* — Quynh Nguyen (57) ABSTRACT

A message processing application may receive at least one inquiry message from a user device in the form or a text message, email or other communication message format. The message may be received and processed to identify the content of the inquiry message to determine whether the inquiry message should be transferred to a live agent or whether the inquiry message should be responded to with an automated response stored in a database.

15 Claims, 10 Drawing Sheets

SHORT MESSAGE SERVICE (SMS) RESPONSE AND INTERPRETATION APPLICATION

TECHNICAL FIELD OF THE APPLICATION

This application relates to a method and apparatus of receiving and processing user submitted input from a user device, and more particularly, to receiving user submitted SMS messages and creating responses based on the message input content received.

BACKGROUND OF THE APPLICATION

Conventionally, a user would submit a text message or short message service type message (SMS) to a known service provider in order to receive certain feedback. SMS-based messaging and question generation are becomingly increasingly popular as it saves time for the customer, the customer support center and requires less people to answer phone calls and address user concerns. Also, in the case of interactive voice response (IVR) systems, a user may be faced with various options for pressing phone keys to be directed to the correct department or in an effort to speak with a live agent.

The common and conventional SMS message processing applications generally have strict rules for messages that are received and processed by the interpretation server on the service provide side. For instance, a common example may be to respond to a customer inquiry or initiate a payment request to the customer's mobile device with instructions, such as "Reply 1 for Payments", "Reply 2 for Agent Support", "Reply 3 for more options". Then if the user replied with an option that does not match what the application is anticipating at that time, normally an error message would be returned to the user, such as "We're sorry—we don't understand you" or "Please try again" without any recourse for providing the user with assistance or addressing what the user is requesting.

Other example conventional IVR applications may provide a way for the user with access to an agent when automation options continue to fail (i.e., press "0" for an operator or a live customer agent), etc. This configuration is common with SMS applications. For example, when automation fails, there generally is a response to the individual, however, the response is not in furtherance of the user's request and it generally only provides that the user has made an error, and sometimes a phone number is provided that the user should call if they need further assistance.

SUMMARY OF THE APPLICATION

One example embodiment of the present application may provide a method that includes receiving at least one inquiry message from a user device, processing content of the inquiry message to determine whether the inquiry message is satisfied via at least one automated response message stored in an automated response library, determining the inquiry message cannot be satisfied from any of the messages in the automated response library, transmitting the inquiry message to a live agent communication device, receiving at least one response selection from the live agent communication device, and transmitting an automated response to the user device based on that least one response selection.

Another example embodiment of the present invention may include an apparatus that includes a receiver configured to receive at least one inquiry message from a user device, and a processor configured to process content of the inquiry message to determine whether the inquiry message is satisfied via at least one automated response message stored in an automated response library, determine the inquiry message cannot be satisfied from any of the messages in the automated response library. The apparatus may also include a transmitter configured to transmit the inquiry message to a live agent communication device, and the receiver is further configured to receive at least one response selection from the live agent communication device, and the transmitter is also configured to transmit an automated response to the user device based on that least one response selection.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
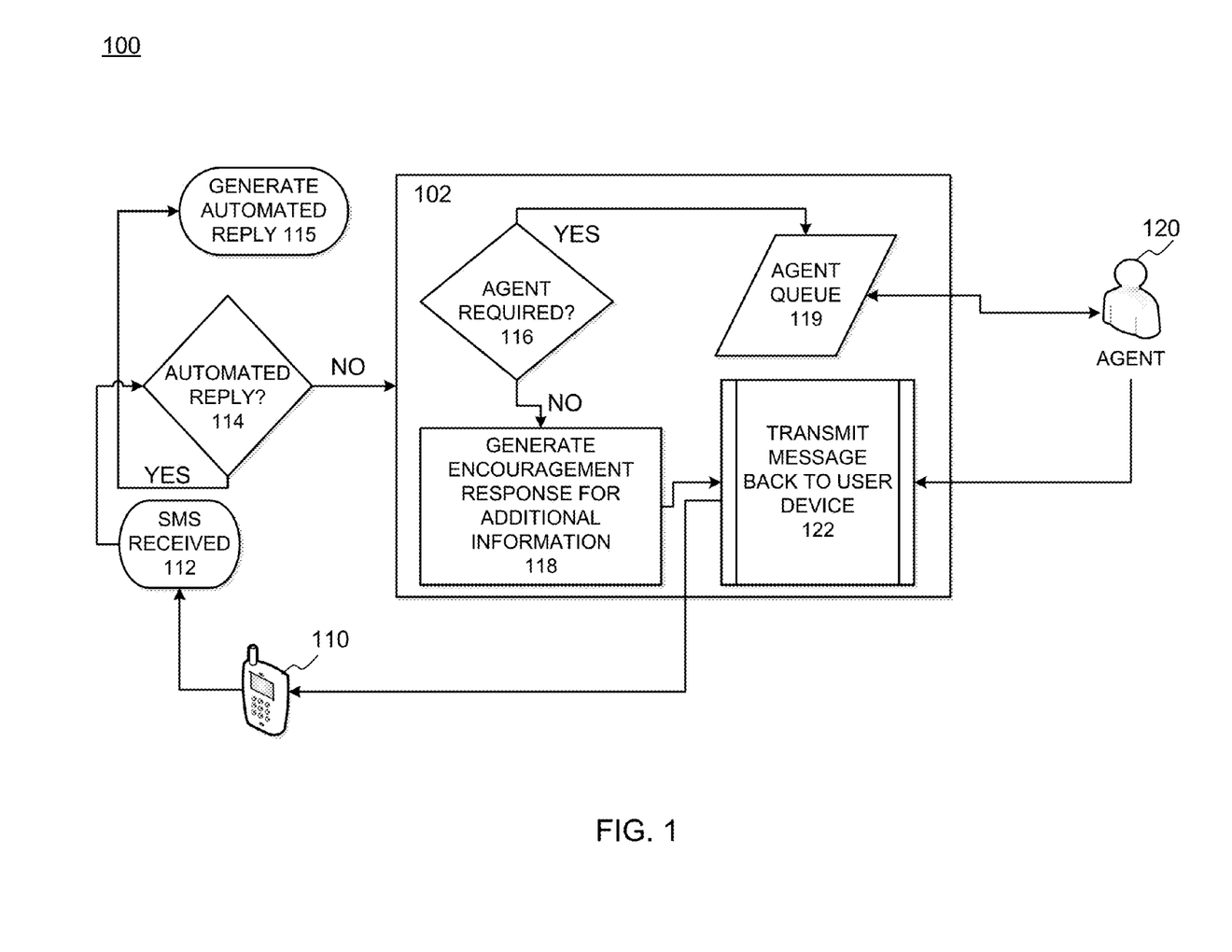
FIG. 1 illustrates a SMS message processing logic diagram according to example embodiments of the present application.

FIG. 1 illustrates an example communication system diagram and related application system according to example embodiments. Referring to FIG. 1, the configuration 100 includes a user device 110 being used to initiate a message, such as a question, inquiry, request, etc., to a customer service message processing system. The user device may be a computer, laptop, mobile, wireless or cellular phone, a PDA, a tablet, a client a server or any device that contains a processor and/or memory, whether that processor or memory performs a function related to an embodiment of the invention.

According to one example, the message may be a SMS message with various words, symbols, images, audio, etc., or other content types used to submit an inquiry to a message processing system at a remote site. The user may be a customer of a cable company or a bank or another institution that provides a service or content to the user and which requires some form of customer support feedback. The user may ask a question via a SMS message and transmit the message to a customer service support center by entering a short code or other compatible code (e.g., email, telephone number, etc.) and submitting the message and the corresponding content to the short code recipient in lieu of a reply.

According to one example, FIG. 1 illustrates a user device 110 sending a SMS message to a designated SMS processing server and/or a shortcode associated with the customer support center. The SMS message may be received and processed 112 from the service provider and if the user's message invokes an error message or is otherwise not recognized or is redirected to an automated reply service, then a reply may be generated 115 and transmitted back to the user in response to the question(s) submitted. For example, the SMS message may be received and parsed to identify each word, the word associations, if any, and the user's message purpose may all be derived from the user's message. If no automated reply 114 can be used and/or the SMS message is identified as being irrelevant and/or its content is not readily identifiable, then the message may be passed to the message processing center 102 for additional message processing considerations. A mobile originated message (MO) is a type of message that was sent from the mobile device and a mobile terminated message (MT) is a type of message that was received at the mobile device and which was originated by a different device or other mobile device.

If a message includes a keyword or keywords that are associated with an automated response then the words in the SMS message will be analyzed and associated with a predefined response or menu option. For instance, if the user submits a SMS message with the words "I need help with upgrades", the automated reply processing function may identify the words, "help" and identify the user's concern as being related to their account or certain common changes to a service plan as opposed to a technical question which would be identified from a message such as "the network is broken" or "the cable is down". The word "help" may invoke an agent forwarding action. The word "upgrade" may identify the purpose of the help needed and forward the user to an agent 120 or group of agents associated with an agent queue 119 who are all qualified to assist the user when the next agent who is part of the queue becomes available.

An automated response database or repository may include a large list of automated responses to questions to avoid having to transfer the SMS message inquiry to a live agent or agent queue. For example, the automated reply function may have an automated response to the user's question "I need help with upgrades". For instance, the cable provider may have five different cable packages ranging from basic to platinum elite. The automated response function may identify the user's request and respond by submitting an automated message stored in memory "are you aware there are presently five packages available, which were you interested in upgrading to?", the user may then continue the automated menu options by selecting options 1, 2, 3, 4 or 5 which causes another response to be generated and sent to the user until an agent is needed.

The message processing center 102 may be a server and/or a cloud-based message processing resource that readily accepts the message and stores it in memory. The agent determination operation 116 may identify the words and phrases in the SMS message as being unidentifiable and unrelated to any automated response that may be considered satisfactory to the user's inquiry. In this case, the message may be forwarded to the agent queue 119 until an agent 120 is available to identify the message. The agent may have a shortcut option available to immediately dismiss the SMS message as being wrongly misinterpreted by the server 102. For example, the agent can offer human interpretation that in some cases identifies a word or phrase that is clearly part of the automated menu options. For instance, the user's SMS message may have multiple words included related to billing, upgrades, etc. The agent may decide that billing was the user's main priority and forward the message to an automated response option for billing that immediately responds to the user's message with a billing menu option to address billing concerns.

In another example, the SMS message may be interpreted to have certain relevant information that may be related to one or more automated menu options. In this case, the server 102 may determine that no agent is required 116 but may instead parse the message to identify one or more words of interest to promote or encourage the user to provide a narrowed-down response. The server 102 essentially interprets the inquiry message and answers the inquiry with another inquiry by generating an encouraging response for additional information 118. For example, the user may submit a SMS message that states "I need help with upgrading my cable television and paying my bill via the phone application and watching the movies on my phone as well". A human agent would know that the user has asked three questions all of which are easily answered by different automated menu options. However, the server 102 is generally not in favor of forwarding anything to an agent to answer that is not answerable by automated options.

Alternatively, the server 102 may identify the message is received during peak usage hours (e.g., 10 am to 3 pm) and may not permit the agent forwarding operation on the first or second response cycle. Under those circumstances, the server 102 may attempt to promote automated menu options first prior to any agent forwarding operations. The application may identify the words or terms, "upgrading", "paying", "watching movies_on_phone" and be able to select three automated menu options to share with the user via a response SMS message. Initially, the server 102 may identify three automated responds strategies and establish a priority order for processing the messages. For example, first the server 102 may generate an encouraging response 118 using one or more words from the user's SMS message, such as "you are trying to pay your bill?", press "1" for YES and "2", for something else. The user may then select "1" and pay the bill, enter credit card information and then immediately receive another SMS message, "you want to upgrade your TV package to include something you don't currently have?", press "1" for YES and "2", for something else. The last option in the priority queue of responses would be to offer the user with instructions on how to use their smartphone application to watch content streaming from a remote streaming server as part of their subscription. As a result, all of the user's inquiries were answered in succession based on a priority scheme and based on multiple automated responses that were first confirmed by individual encouraging messages that asked for additional information and/or confirmed information already identified in the user's original SMS message.

Figure 2:
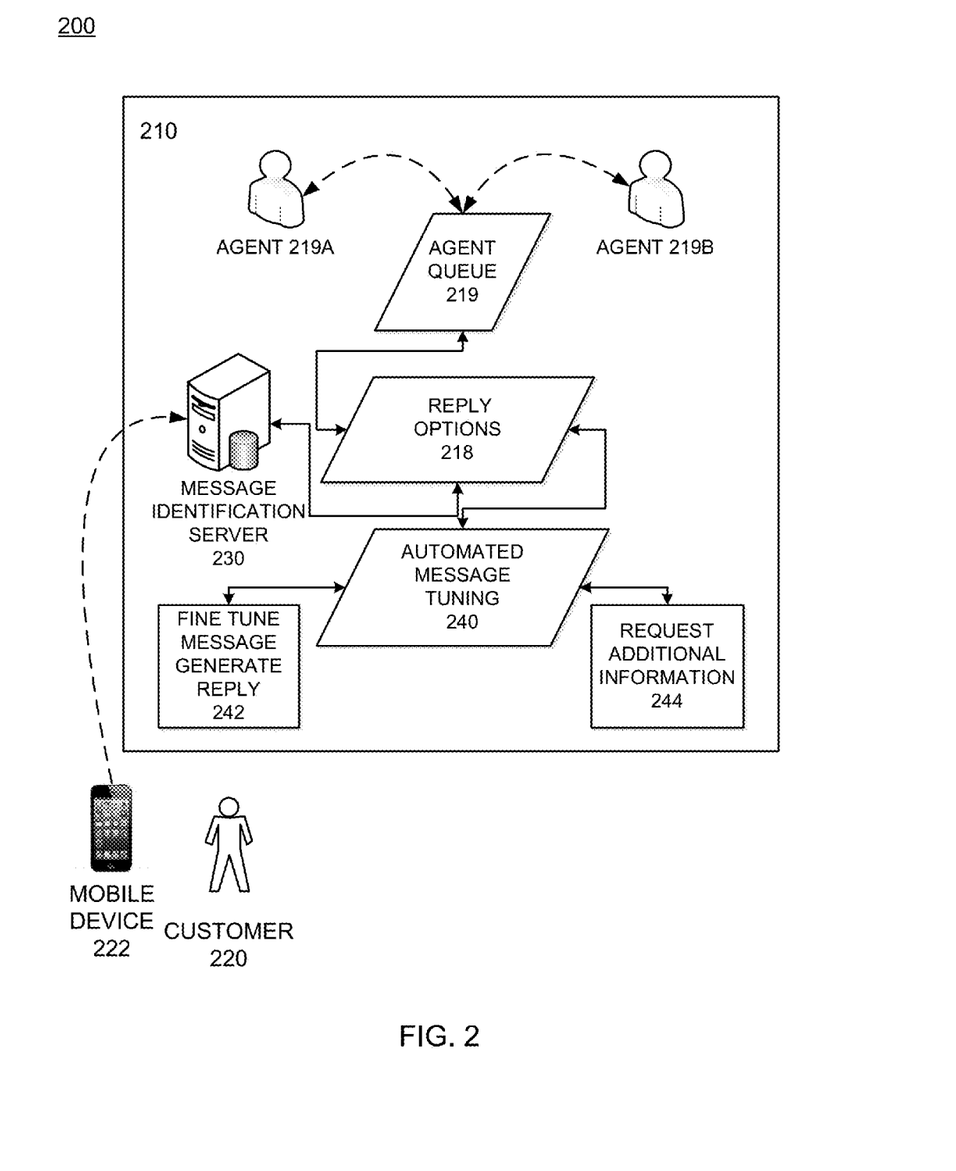
FIG. 2 illustrates an automated SMS message processing system according to example embodiments.

FIG. 2 illustrates additional details of the agent queue and the message delegation process according to example embodiments. Referring to FIG. 2, the message processing system 200 includes a message processing center 210, which may be a corporate or enterprise based processing center or a third party call processing center used to handle customer service calls, emails, SMS messages, etc., from a user.

In one example, the customer 220 may use his or her mobile device 220 to initiate a short service message (SMS) with certain content to a call processing center 210. The user may submit the SMS message to a telephone number or shortcode that is known to the user as a customer support service offered by the service provider. The SMS message may be received and processed by the message identification server 230 which receives the message, identifies its purpose and whether it can be responded to by an automated response (with or without message tuning) and whether or not a live agent is needed to respond to the SMS message. The reply options 218 are then identified as possible response strategies to answer the user's inquiry. Once it is determined that the user's inquiry is not answerable by an automated response or a fine tuned response/inquiry that is based on the content of the user's message, the SMS message may be forwarded to the agent queue management 219 which then determines which agent 219A, 219B, etc., is available to process the message.

In another example of FIG. 2, the message identification server 230 may identify that the reply options 218 for the message provide automated response options which include an automated message tuning operation 240 that uses words or phrases from the message to generate a reply 242 that guesses the meaning of the message although it may not be readily understood by the server 230. However, the automated message tuning 240 may instead identify keywords that are likely to be related to an automated reply option and request additional information 244 via a response question to the user's submitted message.

Figure 3A:
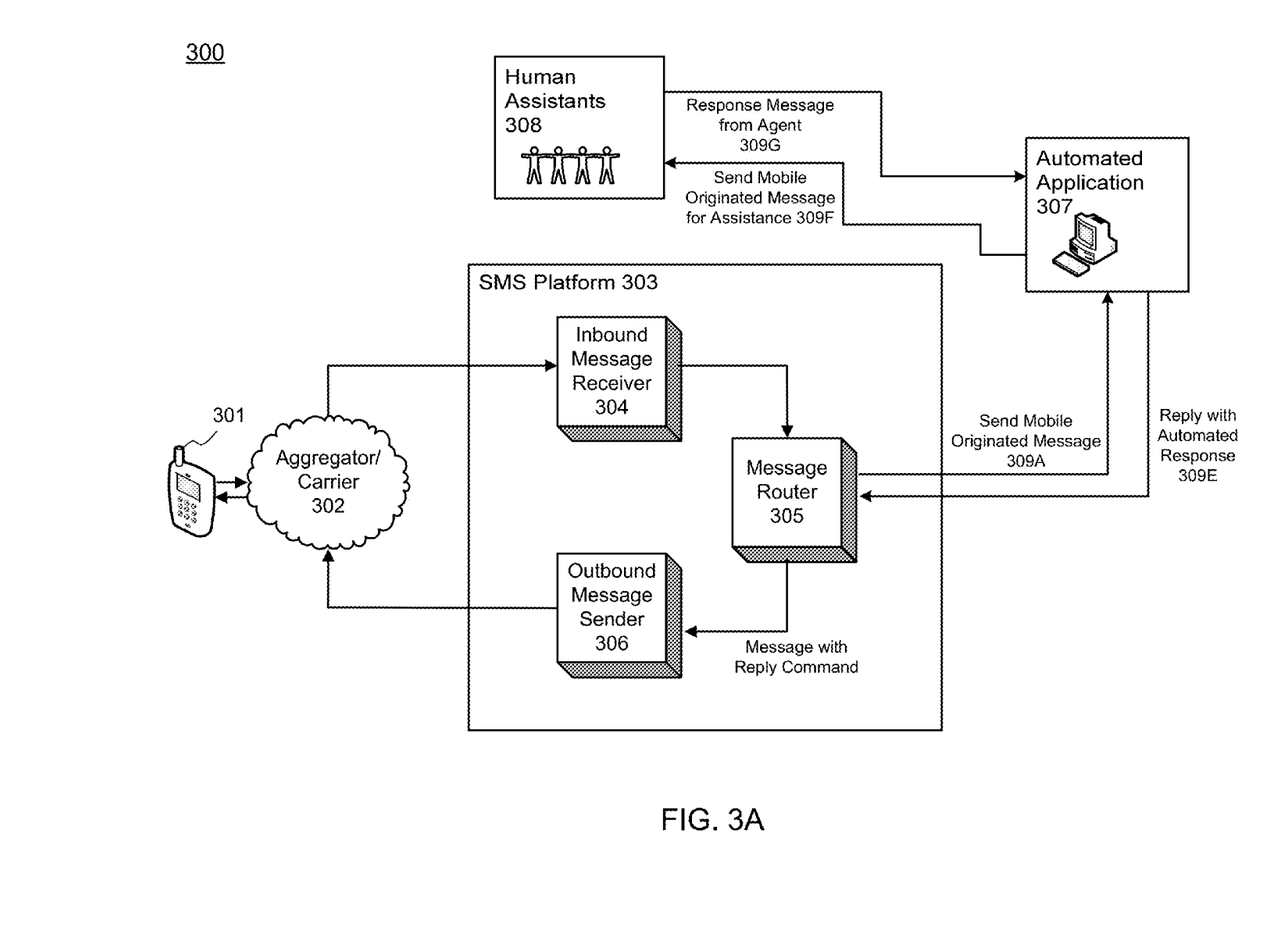
FIG. 3A illustrates an example network configuration of a SMS message processing platform according to example embodiments of the present application.

FIG. 3A illustrates an example network configuration of a SMS message processing platform according to example embodiments of the present application. Referring to FIG. 3A, the configuration network 300 may include a user device 301, which may generate a user submitted message to an aggregator/carrier network 302 which routes the message to an SMS platform 303 configured to receive the message via an inbound message receiver 304. The message may be received and processed to identify keywords or other information necessary to route the message to a response processing entity. The message router 305 may identify the computer IP addresses of an automated application server 307 operating locally or in the cloud. The message router 305 may instead route the message to a group of live agents 308 for an intelligent response strategy. In one example, a message that does not match any automated response options may be sent to a agents 308 for interpretation. The response may be clear from a human perspective but may require a designation for response that the computer application was unable to provide. If the user submitted a message that included "I need to pay my bill!!!", the message 309A may not be understood by the application 307 and may be sent 309F to an agent (human) for assistance 308. The agent 308 may not directly respond to the user, however, the agent would be able to change the message sent by the user to a "1" selection (i.e., press "1" to pay your bill) as noted in a previous example, which would then be sent back 309G to the application, without the user ever knowing they fixed their response to meet the application's needs. The reply message 309G may then be forwarded back to the message router 305 which forwards the message to the outbound message sender 306 to be returned to the user device 301.

According to example embodiments, the SMS automated application would attempt to process a message based on rules, regular expressions, lists of responses that are valid. However, if the meaning of the message cannot be identified then the message could be sent to an SMS assistant application, which is used by a pool of call center agents. In operation, the agent will review the message, designate the message under a particular automated response category, and tag the message for future analysis to further optimize the auto-response criteria. If the agent could not link the message to match any of the automated responses, he or she can submit a written response or customized response and transmit it back to the main SMSM application. As a result, the automated application will transmit back the response for the reviewed message or dispatch the agent driven response back to the SMS platform to deliver it to the customer.

Figure 3B:
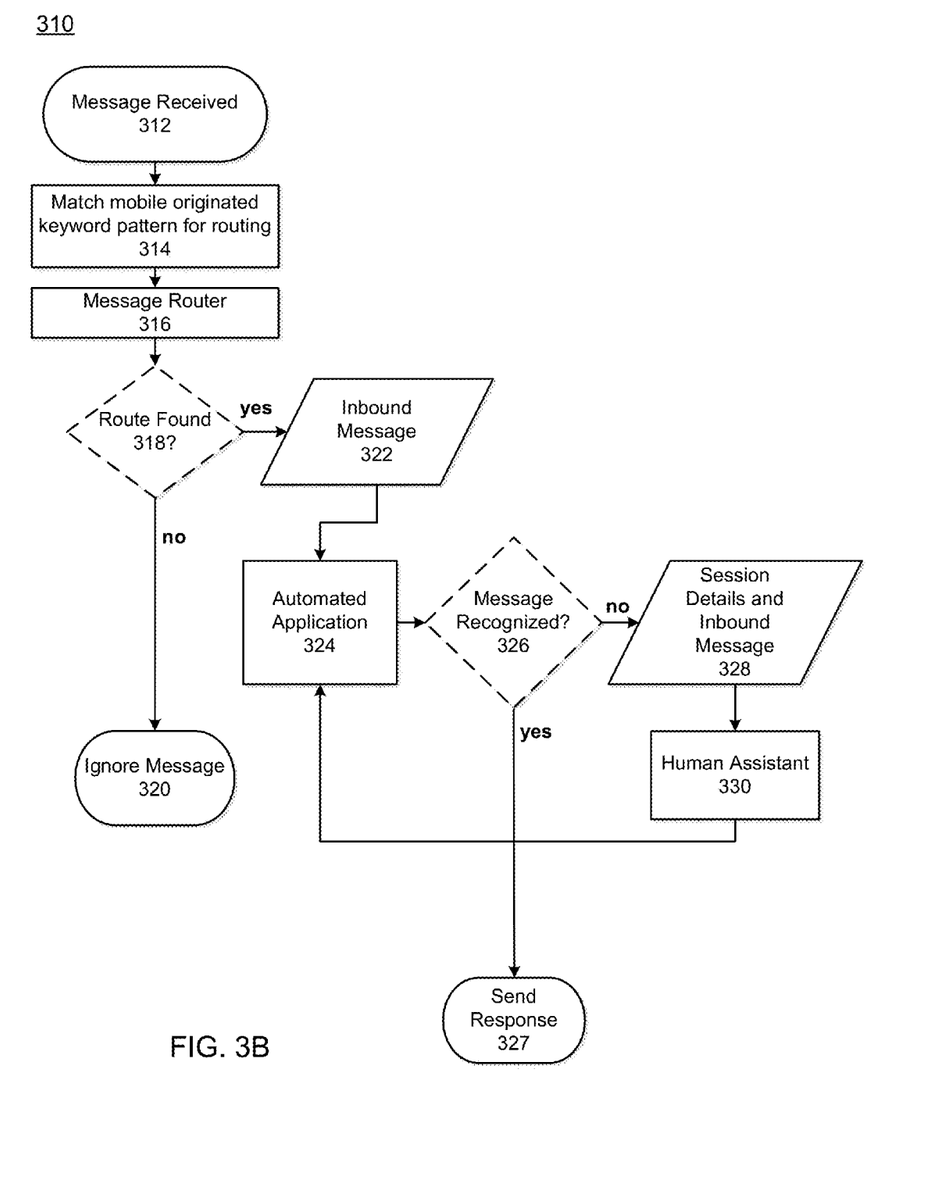
FIG. 3B illustrates a flow diagram according to example embodiments of the present application.

FIG. 3B illustrates a flow diagram according to example embodiments of the present application. Referring to FIG. 3B, the flow diagram 310 includes a process of receiving a user initiated message and processing the message to provide the best possible feedback to satisfy the user's request. In operation, the message may be received 312 and a semantics matching operation or parsing operation 314 is performed to identify any keywords, keyword patterns of groups of words and other key portions of the message to route the message via a router 316 to the correct response engine or module. A determination is made as to whether an acceptable route is found 318, and if not the message is ignored 320 or a negative response is returned, "incorrect, please try again". In the event that the message is found to have a correct route then the message is processed as an inbound message 322 with the automated application 324. The details of the message are identified to determine if the message can be processed via the automated application 324 which would return an automated response based on the content of the SMS message.

A received message may be identified as having multiple different words or phrases that are identified by the automated application library. For example, the library, may have various categories and related terms associated therewith which are linked to a particular string of words used as a response. For instance, the user may submit "I need to pay my bill, learn about sports packages and add a broadband Internet package." As a result, the user's message may be identified as having three separate responses stored in a response queue, one for paying the bill, one for upgrades based on sports and the third for other services offered by the cable company. The first message to be generated by the automated application 324 may be a bill pay option, such as "press "1" to pay your bill now by credit card . . . " Once the user has finished paying his or her bill, the second message in the response queue may need to encourage a response since the user's wants are unknown. For example, "you mentioned "sports", what sports are you interested in?, please type an answer".

The library of responses may include all such packages offered by the cable provider, "international soccer", "NFL", "college football", etc. If the user's response is not accurate enough, then additional questions may be asked. For instance, "you mentioned "football", please press "1" for college, "2" for the NFL, "3" for other options." The user's response may not be understood by the automated system. The session details and the inbound message 328 may then be forwarded to the live agent or human assistant 330 so the message may be interpreted. For example, the user may have provided "Yes, I want to see the Duke Blue Devils boys basketball play this season". The library of responses in the automated application may not have a record of such information, the human assistant 330, however, may be able to respond to the message by selecting an automated option for college basketball which is sent as a response 327 to the user's message, and which the user may then select accordingly.

Figure 3C:
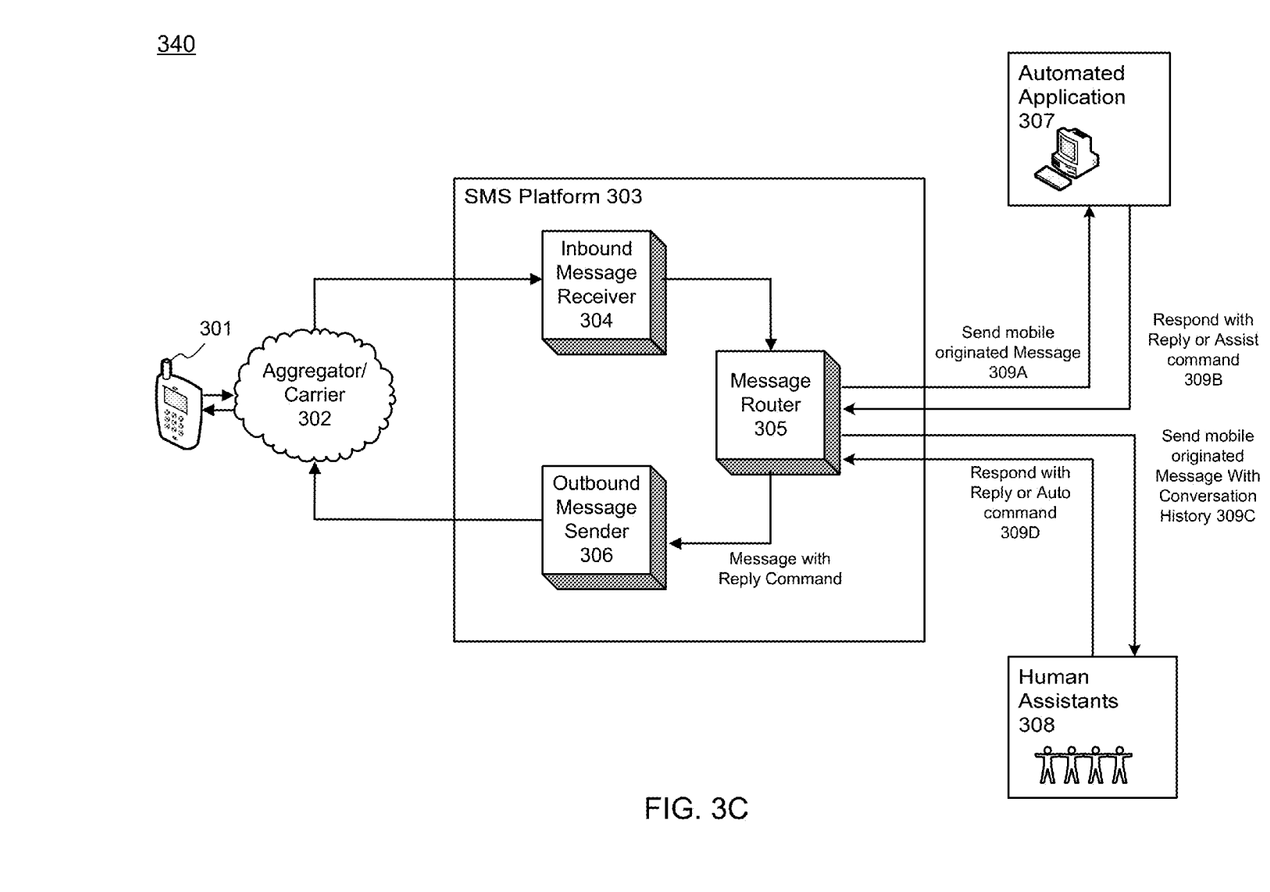
FIG. 3C illustrates another example network configuration of a SMS message processing platform according to example embodiments of the present application.

FIG. 3C illustrates another example network configuration of a SMS message processing platform according to example embodiments of the present application. Referring to FIG. 3C, the network 340 includes like elements with the network 300 of FIG. 3A, however the message response strategy is different. In this example, the user's message may be forwarded to the automated application 307 and the human assistant agent group 308 contemporaneously. The user's message may be associated with an automated response application 307 and may be linked to the live agent response team 308 which may interject or offer support at any time.

In one example, a live agent can take over control and chat back and forth with the end user via SMS messaging until an issue is resolved and the user's message chain will move back into the automated response category. Once a live agent is finished communicating with an end user, the message chain of messages may be moved back to automation automatically. In fact, the automation may continue onward during the live agent interjection. The agent may be able to transmit a log of all conversation history encountered through the automation process up to the point of transfer to an agent. The agent may then view the previous responses and readily determine the areas that the user is having difficulties with the automated response application.

According to one example embodiment, every message received on the SMS platform is matched against the predefined pattern to determine the routing path. The routing path will generally have two routes 309A and 309C of FIG. 3C, one for the automated application and other for the application managing human assistance. If the current routing path is determined as "AUTO", then the message will be routed to the automated application. If the automated application could match the inbound message with a standard set of patterns predefined through regular expressions, it will generate a response with a command "REPLY" instructing the message router 305 to deliver the response. If the application could not match with any of the regular patterns, it will route the message back to SMS router with a command "ASSIST" for live agent intervention to provide additional support. If the message is sent with a command "REPLY", the router 305 will send the response message to the user device 301. If the current routing path is determined as "ASSIST" or the message is sent with command "ASSIST", the router 305 will send the message with all the session details to the SMS assistance application which manages the pool of representatives. When an agent 308 views the next work item in the queue they can observe the overall context to understand a customer's current experience. The first available representative will make direct conversation with the customer by sending a response with a command "REPLY". Also, the agent can transfer back to the automated application with command "AUTO" and/or a selection for a response to the present question.

Figure 3D:
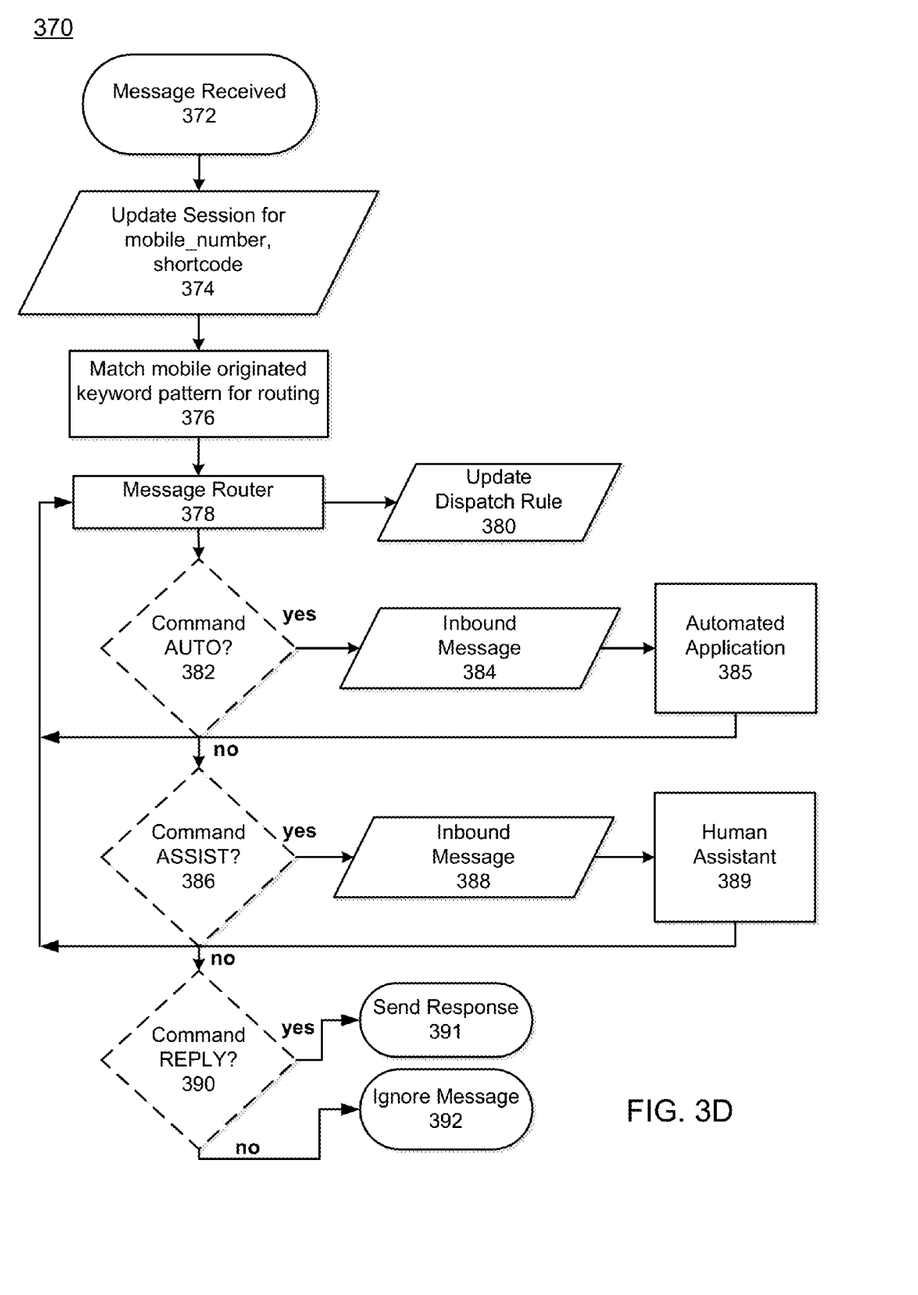
FIG. 3D illustrates another example flow diagram according to example embodiments of the present application.

FIG. 3D illustrates another example flow diagram according to example embodiments of the present application. Referring to FIG. 3D, the flow diagram 370 includes a process of receiving a message 372 and updating a session 374 for the mobile number or shortcode used by the message. A matched keyword pattern may be identified for routing the message 376. The message router 378 may be instructed to route the message to an agent 389 and/or an automated response application 385. The message may invoke the need to update a dispatch rule 380 depending on the content of the message, the frequency of the message, and the agent's feedback. Depending on the command received, "AUTO" 382, "ASSIST" 386, "REPLY" 390, the message router 378 may create an inbound message 384 to be processed by the automated application 385 for an "AUTO" command, and another inbound message 388 to be processed by the human assistant 389 for an "ASSIST" command. Once the message processing is finished, the response 391 may be sent to the end user device or the message may be ignored 392 if no "REPLY" command is received.

In one example, a mobile device may access a content ordering function (i.e., movie ordering) and receive a textual message, such as "please let us know the movie or channel number you wish to order". As a result, the mobile device may transmit a message either textual, voice, etc., that indicates "I would like channel 7-1-6 at 7 pm, I'm trying to watch movie XYZ". In response, the automated response menu may respond by indicating that there was an error, such as "Please retry, we need a channel or movie number". The mobile terminal may then say "cmon! I just want to watch movie XYZ". The application may then identify an error has occurred and re-send a similar message as before, such as "Please retry, we need a channel number or movie number, text ASSIST for further assistance". The mobile device may then transfer an ASSIST message and be placed to a live agent who proceeds to explain the error of submitting one but not both parameters. The automated menu may then reinstate and the user may then proceed to enter the name "movie XYZ" or the agent can do it manually. However, the automated may reinstate just to confirm the purchase. This configuration provides a way to go back and forth between agent and automated menu options via a phone application for service.

Figure 4A:
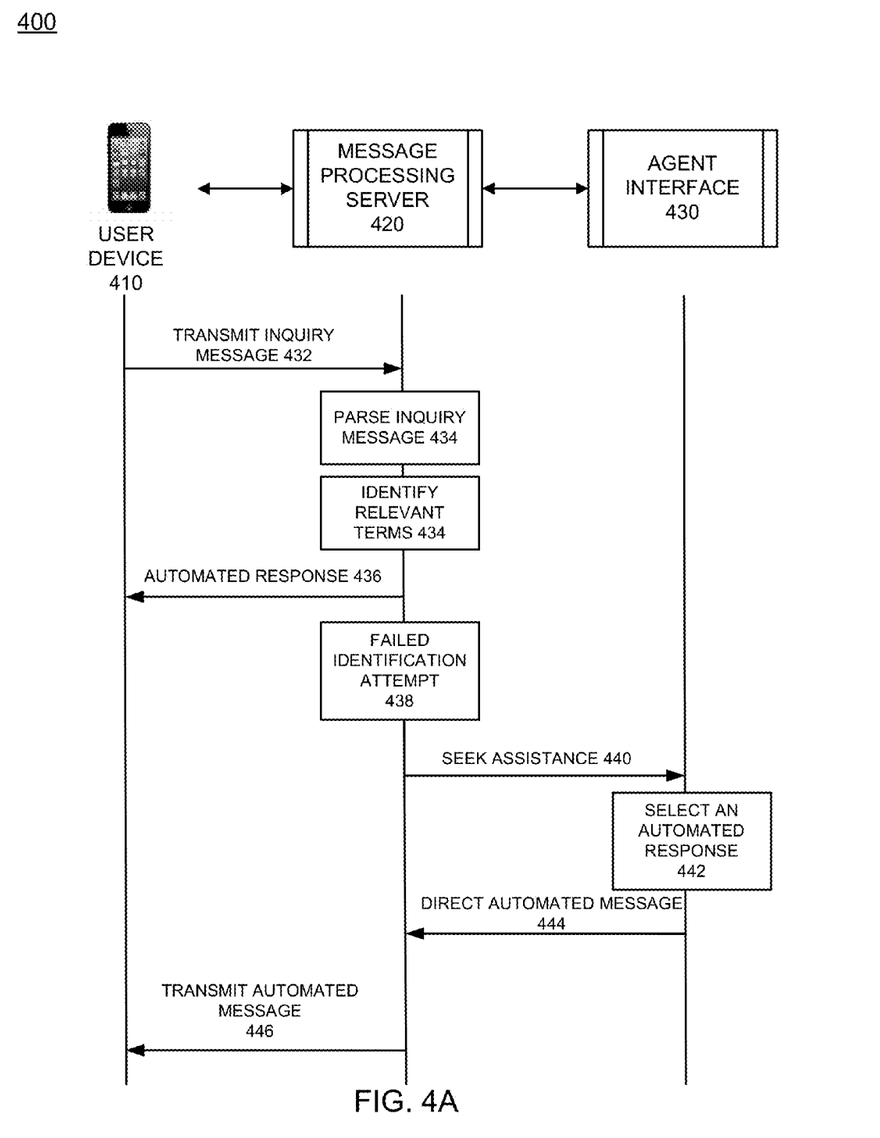
FIG. 4A illustrates an example communication flow diagram according to example embodiments of the present application.

FIG. 4A illustrates an example communication flow diagram according to example embodiments of the present application. Referring to FIG. 4, the communication signaling diagram 400 includes a user device 410 initiating a SMS message 432 to a message processing server 420, which parses the inquiry 432 to identify if any terms or phrases 432 correlate with the automated response strategies available via the automated response application. The server 420 may generate an automated response 436 if the terms are known. The server 420 may also identify a failed identification attempt 438 based on a subsequent message or the same message and seek assistance 440 from a live agent via the agent interface 430. The agent may receive the message, history information from previous commands and be able to select an automated response 442 that is relevant and direct that selection 444 back to the sever 420. The server may then follow the command to transmit a particular automated response 446.

Figure 4B:
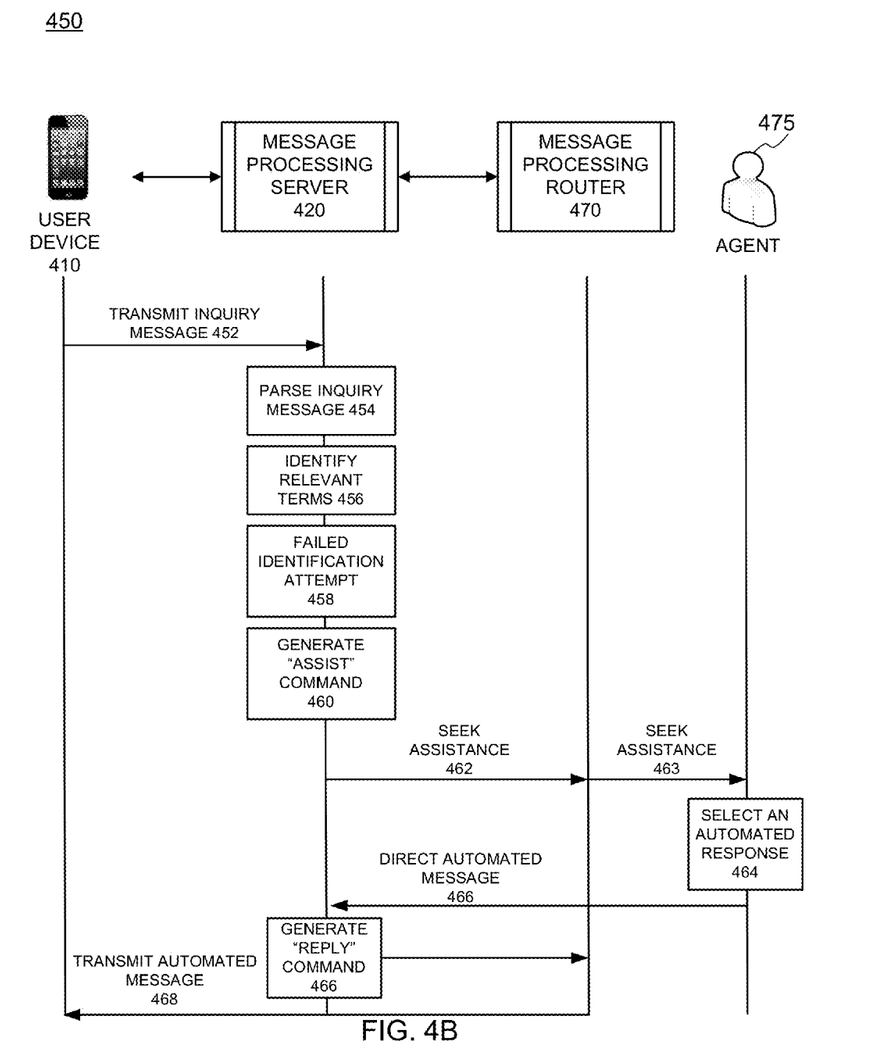
FIG. 4B illustrates an example communication flow diagram according to example embodiments of the present application.

FIG. 4B illustrates an example communication flow diagram according to example embodiments of the present application. Referring to FIG. 4B, the communication diagram 450 has a user submit a message inquiry 452 that is parsed 454, with the terms identified 456 and the failed identification attempt is noted 458 so an "ASSIST" command is then generated 460. The assistance message 462 is transmitted to the message router 470 which forwards the same or another message 463 to the agent 475. The agent may perform a manual selection 464 which is then sent back to the server 420 as a direct message command 466. The server may generate a "REPLY" command that instructs the router 470 to transmit the automated message 468 back to the user device 410.

Figure 5:
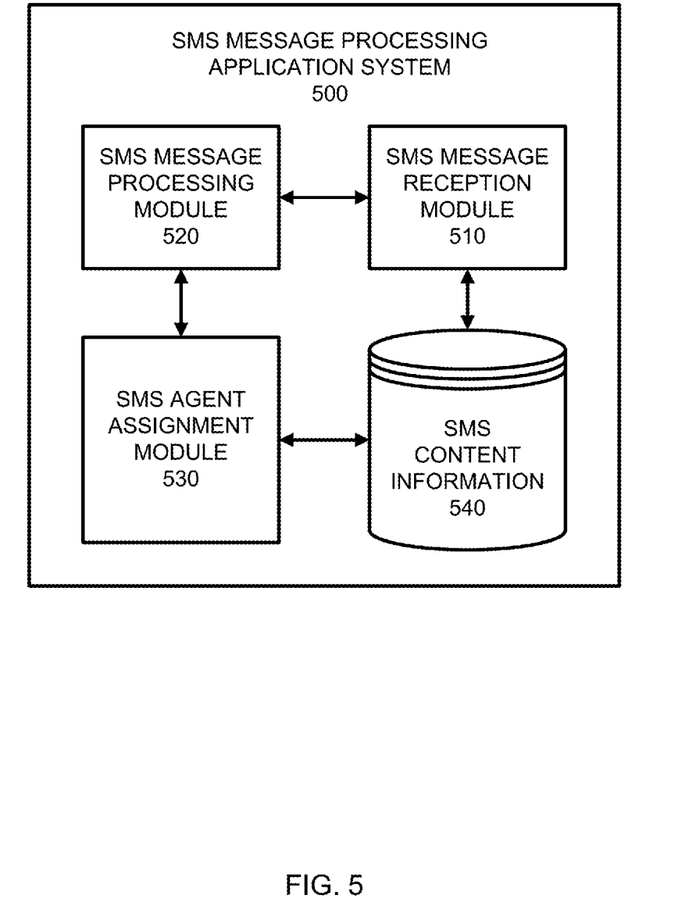
FIG. 5 illustrates a message processing system configuration that is configured to perform one or more operations corresponding to the example embodiments.

FIG. 5 illustrates an example system configuration for processing and performing one or more operations associated with the SMS message processing examples. Referring to FIG. 5, the SMS message processing application system 500 may receive at least one inquiry message from a user device at the SMS message reception module 510, and process content of the inquiry message via the SMS message processing module 520 to determine whether the inquiry message should be transferred to a live agent queue or whether the inquiry message should be responded to with an automated response stored in a database 540. The inquiry message may be transferred to the live agent queue via the SMS agent assignment module 530 if the automated responses in the database 540 do not satisfy the inquiry message.

According to another example embodiment, the system 500 may provide a method that includes receiving at least one inquiry message from a user device at the reception module 510 and processing content of the inquiry message to determine whether the inquiry message is satisfied via at least one automated response message stored in an automated response library at the processing module 520. The method may also provide determining the inquiry message cannot be satisfied from any of the messages in the automated response library and transmitting the inquiry message to a live agent. The reception module 510 may also perform receiving at least one response selection from the live agent, and transmitting an automated response to the user device based on that response selection.

The inquiry message is a short message service (SMS) message that includes a plurality of words. Prior to transmitting the inquiry message to the live agent, an encouraging response may be generated to seek additional information from the user device. Such as "thanks we understand you are looking for [parsed word from inquiry], please offer more information . . . " The encouraging response may provide at least one term from the inquiry message and a question phrase inquiring for additional information regarding the at least one term. The system may then receive an additional inquiry response from the user device responsive to the encouraging response to inquiry message and processing content of the additional inquiry message to determine whether the additional inquiry message is satisfied via the automated response message stored in an automated response library. The additional inquiry message may not be satisfied from any of the messages in the automated response library based on the logic interpretation of matching terms and scoring the result and thus the additional inquiry message may be transmitted along with the inquiry message to the live agent. The terms in the inquiry message may be identified which are related to at least one term in the automated response library, and a plurality of encouraging response messages may then be generated each including questions inquiring about additional information for each of the identified plurality of terms in the inquiry message. The various encouraging response messages may then be prioritized and transmitted in the order identified by the priority.

The inquiry message may be a short message service (SMS) message that includes a plurality of words, images, videos etc. The processing of the content of the inquiry message may provide parsing at least one word from the inquiry message to determine whether an automated response should be transmitted to the user device and the word from the inquiry message may be matched to at least one keyword stored in a database. As a result, a response message may be generated to the inquiry message including the at least one keyword, and the response message may be sent to the user device to satisfy the inquiry message.

Another example method of operation may include the system 500 being configured to receive at least one inquiry message at the reception module 510 from a user device and process content of the inquiry message to determine whether the inquiry message is satisfied via at least one automated response message stored in an automated response library. The system may also provide determining the inquiry message cannot be satisfied from any of the messages in the automated response library of the database 540, generating a first command to instruct a routing device to route the message to live agent message processing entity associated with a live agent via the processing module 520. The inquiry message may be routed to the message processing entity associated with a live agent and at least one response selection may be received. The additional command may be used to instruct the routing device where to route the at least one response selection.

The inquiry message is a short message service (SMS) message that includes a number of words. Prior to transmitting the inquiry message to the message processing entity associated with the live agent an updated dispatch rule based on content of the inquiry message may be generated. The updated dispatch rule includes at least one term from the inquiry message that is considered a new term that is then stored in the automated response library. In other operations and responsive to receiving the at least one response selection, at least one third command different from the first command and the at least one additional command may be created for identifying an automated response to be transmitted to the user device. The user inquiry may then be routed to an automated response menu prior to finalizing a response to the user inquiry. The at least one additional command to instruct the routing device where to route the at least one response selection includes a routing command to return the inquiry message to the automated response menu.

The inquiry message may be a short message service (SMS) message that includes a plurality of words, images, videos etc. The processing of the content of the inquiry message may provide parsing at least one word from the inquiry message to determine whether an automated response should be transmitted to the user device and the word from the inquiry message may be matched to at least one keyword stored in a database. As a result, a response message may be generated to the inquiry message including the at least one keyword, and the response message may be sent to the user device to satisfy the inquiry message.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
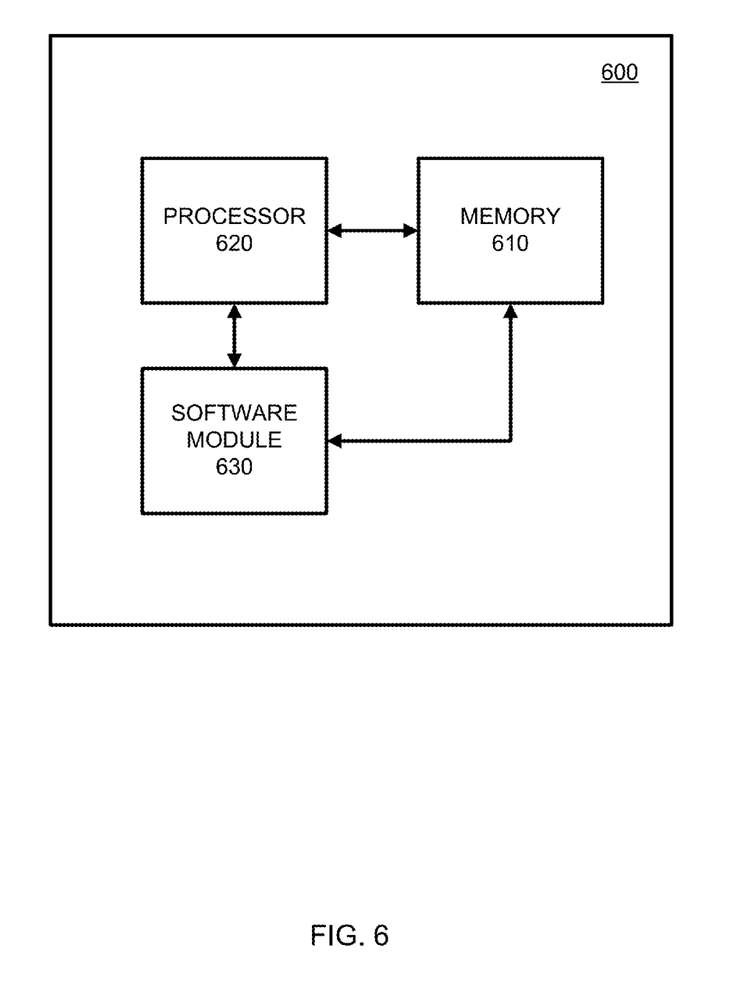
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving at least one inquiry message from a user device;

processing content of the inquiry message to determine whether the inquiry message is satisfied via at least one automated response message stored in an automated response library;
identifying a plurality of terms in the inquiry message which are related to at least one term in the automated response library;
generating a plurality of encouraging response messages each comprising questions inquiring about additional information for each of the identified plurality of terms in the inquiry message;
prioritizing the plurality of encouraging response messages; and
transmitting the plurality of encouraging response messages in an order identified by the priority;
when the inquiry message cannot be satisfied from any of the messages in the automated response library:
transmitting the inquiry message to a live agent communication device;
receiving at least one response selection from the live agent communication device; and
transmitting an automated response to the user device based on the at least one response selection.

2. The method of claim 1, wherein the at least one inquiry message is a short message service (SMS) message comprising a plurality of words.

3. The method of claim 1, further comprising:
prior to transmitting the inquiry message to the live agent communication device, generating an encouraging response seeking additional information from the user device.

4. The method of claim 3, wherein the encouraging response comprises at least one term from the inquiry message and a question phrase inquiring for additional information regarding the at least one term.

5. The method of claim 4, further comprising:
receiving an additional inquiry message from the user device responsive to the encouraging response to the inquiry message;
processing content of the additional inquiry message to determine whether the additional inquiry message is satisfied via at least one automated response message stored in the automated response library;
determining the additional inquiry message cannot be satisfied from any of the messages in the automated response library;
transmitting the additional inquiry message along with the inquiry message to the live agent communication device; and
receiving the at least one response selection from the live agent communication device.

6. An apparatus comprising:
a receiver configured to receive at least one inquiry message from a user device; and
a processor configured to
process content of the inquiry message to determine whether the inquiry message is satisfied via at least one automated response message stored in an automated response library,
identify a plurality of terms in the inquiry message which are related to at least one term in the automated response library;
generate a plurality of encouraging response messages each comprising questions inquiring about additional information for each of the identified plurality of terms in the inquiry message;
prioritize the plurality of encouraging response messages; and
a transmitter configured to transmit the plurality of encouraging response messages in an order identified by the priority;
when the inquiry message cannot be satisfied from any of the messages in the automated response library:
the transmitter configured to transmit the inquiry message to a live agent communication device, and wherein the receiver is further configured to receive at least one response selection from the live agent communication device, and the transmitter is also configured to transmit an automated response to the user device based on the at least one response selection.

7. The apparatus of claim 6, wherein the at least one inquiry message is a short message service (SMS) message comprising a plurality of words.

8. The apparatus of claim 6, wherein prior to the transmitter transmitting the inquiry message to the live agent communication device, the processor generates an encouraging response seeking additional information from the user device.

9. The apparatus of claim 8, wherein the encouraging response comprises at least one term from the inquiry message and a question phrase inquiring for additional information regarding the at least one term.

10. The apparatus of claim 9, wherein the receiver is further configured to receive an additional inquiry message from the user device responsive to the encouraging response to inquiry message, and the processor is configured to process content of the additional inquiry message to determine whether the additional inquiry message is satisfied via at least one automated response message stored in the automated response library, and determine the additional inquiry message cannot be satisfied from any of the messages in the automated response library, and the transmitter is further configured to transmit the additional inquiry message along with the inquiry message to the live agent communication device, and the receiver is configured to receive the at least one response selection from the live agent communication device.

11. A non-transitory computer readable storage medium configured to store instructions that when executed cause a processor to perform:
receiving at least one inquiry message from a user device;
processing content of the inquiry message to determine whether the inquiry message is satisfied via at least one automated response message stored in an automated response library;
identifying a plurality of terms in the inquiry message which are related to at least one term in the automated response library;
generating a plurality of encouraging response messages each comprising questions inquiring about additional information for each of the identified plurality of terms in the inquiry message;
prioritizing the plurality of encouraging response messages; and
transmitting the plurality of encouraging response messages in an order identified by the priority;
when the inquiry message cannot be satisfied from any of the messages in the automated response library:
transmitting the inquiry message to a live agent communication device;
receiving at least one response selection from the live agent communication device; and
transmitting an automated response to the user device based on the at least one response selection.

12. The non-transitory computer readable storage medium of claim 11, wherein the at least one inquiry message is a short message service (SMS) message comprising a plurality of words.

13. The non-transitory computer readable storage medium of claim 1, wherein the processor is further configured to perform:

prior to transmitting the inquiry message to the live agent communication device, generating an encouraging response seeking additional information from the user device.

14. The non-transitory computer readable storage medium of claim 13, wherein the encouraging response comprises at least one term from the inquiry message and a question phrase inquiring for additional information regarding the at least one term.

15. The non-transitory computer readable storage medium of claim 14, wherein the processor is further configured to perform:

receiving an additional inquiry message from the user device responsive to the encouraging response to inquiry message;

processing content of the additional inquiry message to determine whether the additional inquiry message is satisfied via at least one automated response message stored in the automated response library;

determining the additional inquiry message cannot be satisfied from any of the messages in the automated response library;

transmitting the additional inquiry message along with the inquiry message to the live agent communication device; and receiving the at least one response selection from the live agent communication device.

\* \* \* \* \*